Feb. 2, 1954    J. M. HARGRAVE ET AL    2,667,678
HAND CLAMP
Filed April 28, 1950

INVENTOR.
John M. Hargrave and
Delbert L. Farmer
BY
Wood, Arey, Herron & Evans
ATTORNEYS Patented Feb. 2, 1954

2,667,678

UNITED STATES PATENT OFFICE 2,667,678

HAND CLAMP

John M. Hargrave, Cincinnati, and Delbert L. Farmer, Norwood, Ohio

Application April 28, 1950, Serial No. 158,792

4 Claims. (Cl. 24—253)

This invention relates to hand clamps and particularly those which are capable of adjustment to a plurality of clamping pressures.

It has been an object and accomplishment of our invention to provide a hand clamp of relatively simple construction which is capable of being adjusted to each of the clamping pressures which are conventionally utilized in clamps of this type. It has also been our object to provide structure in a clamp which insures, in any of the various adjusted clamping pressure positions, a stability which is not easily upset nor is likely to be disturbed. Additionally, we have incorporated into hand clamp structure a conveniently accessible attachment for effecting the various adjustments which does not interfere with either the operation of the clamp by a user or the engaging of the clamp with a piece of work. It has also been an object and accomplishment of our invention to provide a hand clamp structure which may be cheaply and easily fabricated yet possesses all the durability which is needed for a wide variety of uses.

A different way of accomplishing these results is described in co-pending application, Serial No. 68,523, for "Clamping Device," filed December 31, 1948, now United States Patent No. 2,519,652.

There are a variety of hand clamps now in use including C-type clamps, both screw-actuated and spring-urged. Additionally, there are hand clamps composed of lever arms, the ends of which are converged by positive means diverging the opposite ends of the arms. Thus, coil springs having elongated extremities under tension have been used to bring such lever arms together in clamping action. Instead of a coil spring with extensions, coil springs held under compression between the diverged ends of the lever arms may be employed to produce the desired clamping pressure at the opposed ends. Our invention is particularly concerned with lever arm clamps.

Clamps of the type of our invention find utility in many industries. They are particularly advantageous where a continuous pressure over a relatively small area is required for an indeterminate period of time, and under conditions in which shifts of position may be desirable from time to time and where moderate clamping pressure is sufficient for the purposes involved. They may be used in sets to clamp layers of sheet material to hold them together, while operations such as cutting from a pattern are performed thereon. Among the establishments in which clamps of this type find widespread application are in aircraft manufacturing, in textile mills and in furniture factories.

Briefly, our invention involves the concept of varying the pivot point, about which the two arms of the clamp swivel, to any of a plurality of positions corresponding to different clamping pressures. We have found that we may vary the deviations from the normal relaxed position of the actuating spring by providing a plurality of pivot points relative to one arm and a single pivot point relative to the other arm. In the preferred embodiment shown in the drawings, we have chosen to limit the adjustability to two possible clamping pressures only, and for that purpose, we have provided one clamping arm having a double pivot socket and another clamping arm having a single pivot socket. It will be appreciated, however, that the invention itself is not limited to a clamp having merely a pair of possible stable adjusted positions.

Clamps of our invention are adaptable to a plurality of initial clamping pressures. Therefore, in one device we have provided an adjustment for obtaining the optimum pressure not only as to the work being engaged but also in regard to considerations of strain on the hand and finger muscles of the manipulator. This is of particular importance with women workers, who frequently are physically incapable of continuous manipulation of clamps adjusted to substantial pressure. Otherwise stated, these clamps can be adjusted to a lesser pressure when this is a pressure which will accomplish the desired results. Whenever it is found that a greater pressure is desired, claims of our invention may be adjusted to such tension. When such greater tension is employed, the release of the clamp from the work may be effected by simply adjusting the clamp in situ to the lesser clamping pressure and then spreading the jaws apart, with the spring tension to be overcome at a minimum.

In the preferred embodiment shown, this result is accomplished by employing a bayonet pin, that is, a pin which is designed to play in and out of one or more of the sets of holes which receive it, as a pivot pin connecting the arms. Both arms are bifurcated and one is nested in the other. The bifurcations associated with one of the clamping arms are configurated to accommodate the bayonet pin at either of two stable positions, and, upon manipulation of the pin, to permit its transfer from either position to the other.

Additionally, we have provided means for shifting the pivot pin from one or the other of the sockets of the double socketed arm. These means may be actuated from a portion of the clamp which is accessible whether the jaws are together or diverged, or engaging or not engaging a piece of work. For that purpose, our preferred structure includes two keys which are accessible at opposed faces of the clamp, but it will be appreciated that the invention is susceptible to practice in a clamp which has but one such accessible key or which in fact has other means for effecting the desired shift.

We have found that a difficulty in developing clamps of this type has been that of overcoming the relative instability of each of such variety of adjusted clamping pressures. The inherent tendency of the spring to force the clamp to adopt the least possible clamping pressure often resulted in accidental, sudden changes to a different, lesser effective pressure, sometimes accompanied by disengagement with the work or an abrupt shift of clamping contacts, which would mar the work. Therefore, we have incorporated into our structure positive means for holding the clamp at an adjusted clamping position which guards against unintentional abrupt releases of the effective pressure.

Thus, we have incorporated, into the accessible means for effecting the shift, detent structure which insures that once the shift has been completed the clamp will remain at the adjusted pressure until a further change is desired.

These, and other objectives and features of our invention, will be clearer from the following description of the accompanying drawings, in which:

Figures 1 through 4 indicate generally the steps of changing the clamping pressure from a lesser pressure to a greater pressure.

Figure 2 demonstrates the first step in adjusting the clamping pressure from that of Figure 1 to a lesser pressure, the arrow indicating the direction in which the rotating pin and key assembly is to be turned.

Figure 2:
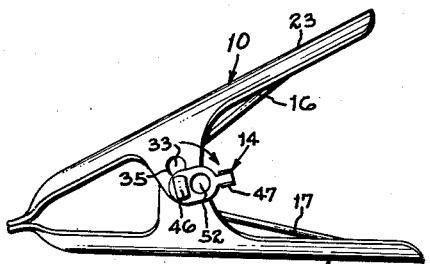
Figure 2 is similar to Figure 1 except that the handle ends are shown in full view.
Figure 3:
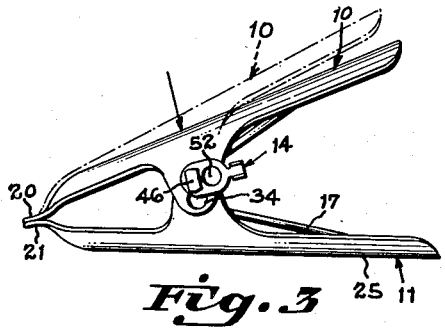

Figure 3 is another side elevation of our clamp. It depicts the clamp after the arms have been squeezed together in the direction indicated by the arrow. The dot-dash lines of Figure 3 indicate the Figure 2 position of the clamping arm to show the shift in position more clearly.

Figure 1:
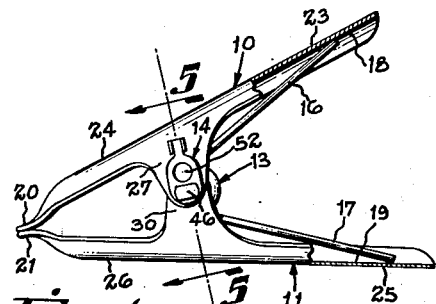
Figure 1 is a side elevation of a spring-type clamp embodying our invention with each of the handles broken away to show the extremities of the spring bearing against the handle end inner surfaces to converge the clamping ends. In the position shown in Figure 1, the clamp is at the position corresponding to the lesser pressure of the two stable clamping pressures.
Figure 4:
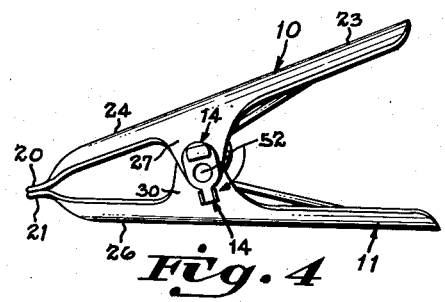

Figure 4 is a side elevation of our clamp showing the completion of the change of location of the pivot point from its location in Figure 1, i. e., from a lesser clamping pressure to a greater clamping pressure. The arrow in Figure 4 indicates the direction of rotation of the rotating pin and key assembly to complete the change.

Figure 5:
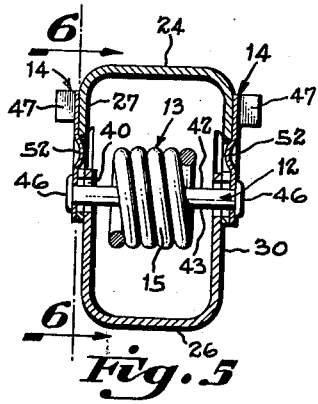

Figure 5 is a section taken along line 5—5 of Figure 1.

Figure 6:
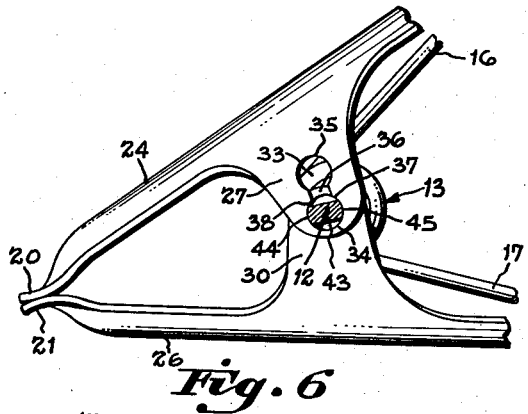

Figure 6 is a section taken along line 6—6 of Figure 5.

Figure 7:
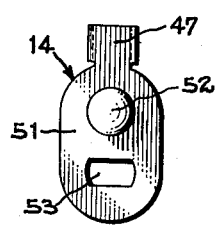

Figure 7 is a rear elevation of the pin adjusting member separate and apart from the clamping device, the rear face being opposed to that visible in Figures 1 through 4.

Figure 8:
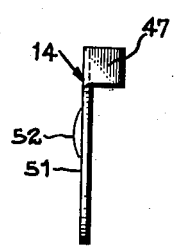

Figure 8 is a side elevation of the member shown in Figure 7, as if viewed from the right hand side of Figure 8.

Clamps of our invention may conveniently be fabricated from but five or six elements: a pair of bifurcated lever arms 10 and 11 with their bifurcations nested, a bayonet pin 12, a coil spring 13, and one or a pair of keys 14 for simplifying the rotation of the bayonet pin. Pivot pin 12, in either of its possible stable positions, is generally disposed centrally intermediate the lever arms 10 and 11. Coil spring 13 consists of a helix 15 and two extensions 16 and 17, of substantially equal length extending in the same general direction away from the pivot pin, the extensions themselves defining an acute angle. Spring 13 has a core sufficiently large for the pivot pin to move from one extreme position to the other without necessarily contacting the inner face of helix 15. Spring extensions 16 and 17 may preferably be bent to converge toward the centers of the respective handle inner faces 18 and 19 against which they bear so that the effective tension of the spring will be transmitted most efficiently to the clamping jaws 20 and 21.

Lever arm 10, as shown, may be constituted of material of substantially uniform thickness and is configurated to provide a curved smooth outer surfaced handle 23 for the application of hand pressure. At the opposite end of lever arm 10 is its clamping end 24, which is provided with a tip or jaw 20 for engagement with one surface of a piece of work in conjunction with a mating portion of lever arm 11. Similarly, lever arm 11 has handle end 25, clamping end 26 and jaw 21. It will be noted that lever arm 10 is slightly broader than lever arm 11, in order to provide for telescoping of the bifurcations of one into nested relationship with the bifurcations of the other. Thus, ears 27 of lever arm 10 are disposed flushwise with respect to ears 30 of lever arm 11. Each of lever arms 10 and 11 is internally symmetrical, i. e., their features which are shown in the elevations of Figures 1–4 and 6 have their counterparts in the side hidden from view. The arcuate nature of the handle ends 23 and 25 provides convenient grasping surfaces for exerting hand pressure to bring the handles together and thereby to separate the jaws, whether to contact a piece of work or to release work from the clamping pressure of the jaws. Conjointly are provided handle inner surfaces 18 and 19 which are trough-like in character to embrace the spring extensions 16 and 17 bearing against these inner surfaces.

Bifurcations 27 of arm 10 have cut from each of them an opening 33 which defines a pair of sockets 34 and 35 for receiving the pivot pin 12 and permit its rotation therein. As shown, opening 33 is somewhat dumb-bell in shape defining an outer socket 34 and an inner socket 35 joined by a constricted neck opening 36 which defines shoulders 37 and 38 of socket 34. Lever arm 11 likewise has a pair of bifurcations 30 which reside snugly inwardly with sufficient clearance for relative pivotal movement of arms 10 and 11.

Each of these bifurcations or ears 30 is provided with pin receiving holes 40 which, in the structure shown, are substantially the same area as either of the sockets 34 and 35. Bayonet pin 12 is the pivotal connection between the sets of ears 27 and 30 and is disposed through the core of the coil spring 13. As shown, pin 12 has flat parallel sides 42 and 43 and curved sides 44 and 45 and is of uniform cross section throughout its length except for heads 46. The radius of curvature defining the arcuate sides 44 and 45 is related to the areas of sockets 34 and 35 and apertures 40, so that the pin may freely rotate within these journals and still be capable of adopting an adjusted, fixed position with respect to the clamping arms. The extent of flattening the sides 42 and 43 is determined in conjunction with the width of neck 36 of the slots 33, carried by ears 27.

Thus, upon alignment, which is accomplished by a 90° rotation of the pin from the position shown in Figures 1 and 5, the pin may be forced through constriction 36 by squeezing arms 10 and 11 together in the manner indicated in Figure 3. Even though the Figure 3 position is unstable in that in the absence of pressure the pin would revert to the Figure 2 position, a continued rotation of the pin in the direction of the arrow in Figure 4 will result in pin 12 riding in innermost sockets 35 of the double socketed arm 10. Shoulders 37 and 38 operate as detents to prevent the passage of the pin back to the Figure 1 position of lesser spring tension.

We have chosen to employ a pin which is flattened throughout, but the bayonet pin effect can be obtained by only considering the pivot cross section at these shiftable pivot points. Clamps embodying our invention may be provided with rotatable bayonet pins other than flattened pin 12 or its rotation may be accomplished in a variety of ways, such as for example, providing head 46, of pin 12, with a notch in which a screwdriver or the like could be inserted to turn the pin through the quarter circle necessary to pass the narrow dimension of the pin through the neck of slots 33. We have, however, incorporated into our clamp a rotatable key or keys 14 which are mounted externally of the outer faces of double socketed ears 27. Keys 14 are provided with outstanding tabs 47 for ready engagement by the operator's hand or by a pair of pliers or other hand tool. Such tools may be necessary, for example, when the jaws 20 and 21 have been diverged widely to embrace a large piece of work and the tension of the spring is correspondingly great.

Key 14 is shown in Figures 7 or 8 detached from the clamp itself, but it will be understood that we contemplate that these keys are to be integral with the body of the clamp so that an easy means for rotating the bayonet pin to change clamping pressure will always be available. The clamp shown in the drawings show keys at both ends of the bayonet pin, but it will be appreciated that just one key will perform the desired functions just as well.

Key 14 is deformed on its innermost face 51 to provide a button 52 adopted to cooperate with ear sockets 34 and 35 for engagement therewith. It will be noted that the space between button 52 and pin receiving aperture 53 of key 14 is substantially the same as the effective space between the pair of sockets 34 and 35 defined by slots 33 in lever arm 10.

Key 14 may preferably be stamped of thin sheet material and may be mounted under pressure engagement to insure its lying closely adjacent ears 27 and thereby to insure the resulting positive engagement with either inner sockets 35 or outer sockets 34 as the case may be.

Figures 1 through 4 illustrate the succession of steps involved in varying the clamping pressure effective at the jaws of the clamp. Specifically, in the embodiment shown, the change from Figure 1 through Figure 4 is a change from a lesser of two possible clamping pressures to the greater of the two pressures, or, otherwise and respectively stated, a change from a condition of lesser spring tension to one of greater spring tension. It will thus be noted that the position of greater clamping pressure shown in Figure 4 corresponds to a closed-jaw position of the clamp in which the spring is furthest removed from its normal relaxed position. The spring, itself being under greater compression due to the change of the closed-jaw angle defined by the lever arms, similarly exerts a greater thrust against the inner surfaces of the handle which is transmitted to the clamping ends and emerges as an increased effective clamping pressure.

These changes in the closed-jaw angle of the lever arms may be produced in the clamp shown by shifting the axis about which the lever arms pivot relative to one or the other of the lever arms. As a practical matter, any change can only be accomplished when the pivot pin is in the positions shown in Figures 2 and 3. The shift from the Figure 2 position to the Figure 3 position is accomplished by squeezing the lever arms together to drive the pivot pin through the constriction in the double socket aperture. Stability is then attained by rotating the key and pin assembly in the manner indicated in Figure 4, the shoulders formed by the constricted channel then preventing the pivot pin from slipping back to the position of lesser clamping pressure. Similarly, the reversal of the operation, more particularly the change from the Figure 3 position to that of Figure 2, is attained merely by letting the Figure 3 position come to equilibrium, for the tension of the spring itself will easily push the bayonet pin through the neck and into the relatively stable Figure 2 position. The key, as shown, is then rotated counter-clockwise to snap into the out-of-the-way position depicted in Figures 1 and 5.

The positions of the key button in Figures 1 and 4 therefore characterize two of its functions, apart from its accessibility for rotating the pin. In Figure 4, the button of the key serves as a positive engaging means to help subdue the pivot pin in a less normal position than of Figure 1. The Figure 4 engagement of the key button with the socket secures the pin against accidental rotation which might result in an abrupt lessening of the effective clamping pressure coupled with a shift of one arm relative to the other which could easily result in damage to the work being held in place. However, the chief function of the button shown in Figure 1 is not to prevent its rotation, for the pin is already in the most stable of its possible positions. Rather, it is advantageous from the point of view of users of the clamp to have positive means for keeping the key in a relatively permanent position where it is less likely to be in the way. This structure insures that the key will lie flush against the ears of the clamp and will not be in a position to interfere with the exertion of pressure on the handle ends of the clamp by the operator nor is it likely to interfere with the engaging of a piece of work to hold it in place.

Having described our invention, we claim:

1. A clamping device adaptable to a plurality of clamping pressures said device comprising: a pair of arms each having a handle end and clamping jaw, one of said arms having a pivot pin receiving aperture, the other of said arms having a slot therein which has two portions similar in effective shape to said aperture, said portions being joined by a relatively narrow neck opening, a rotatable pivot pin disposed through said aperture and through said slot for pivotally interconnecting said arms, said pivot pin including a flattened portion whereby said pin is adapted for passage through said neck opening, and a coil spring embracing said pivot pin, said spring having extensions diverging the handle ends of said arms and converging the clamping jaws of said arms, said pivot pin dimensioned to reside in either of said slot portions of said second-named arm, a finger-contactible element mounted on said pivot pin and keyed thereto for simultaneous rotation therewith and carried externally of said clamping arms, said element having an inwardly projecting portion for engaging a portion of the slot of said second-named arm.

2. A hand clamp comprising a pair of arms each having a handle end and a clamping jaw, one of said arms having a plurality of pin receiving sockets joined by a neck portion, the other of said arms being configurated to form a plurality of pin receiving apertures, a pivot pin disposed through a socket of the socketed arm and an aperture in the other of said arms and pivotally interconnecting the arms, a coil spring embracing said pivot pin and having two extensions engaging said arms at their respective handle ends, said spring being effective for biasing said arms toward an angular relationship in which the respective handle ends diverge and the respective clamping jaws converge, the said pivot pin being selectively shiftable from one socket to another whereby one arm may be moved relative to the other to change said angular relationship and thereby alter the effective biasing force of the spring.

3. A hand clamp comprising a pair of pivotally connected lever arms, each arm having a handle end and a clamping jaw, one of said lever arms having formed therein a plurality of pin receiving sockets joined by a neck portion, the other of said arms having a plurality of pin receiving apertures formed therein, a pivot pin disposed through a socket of said socketed arm and an aperture of the other arm, said pin pivotally interconnecting said arms, a key for rotatably interconnecting said arms, a key for rotating said pivot pin, said key including detent means configurated to engage a socket of the first named arm when the pivot pin resides in another socket of said first named arm, and means for diverging the handle ends of said clamping arms and converging the clamping jaws of said arms, said means comprising a coil spring embracing the pivot pin and having two extensions, one of said extensions engaging the handle end of one of said arms, the other of said extensions similarly engaging the other of said arms.

4. A hand clamp comprising a pair of pivotally connected lever arms, each arm having a handle end and a clamping jaw, one of said lever arms having formed therein a plurality of pivot pin receiving sockets joined by a neck portion, the other of said arms being configurated to form a plurality of pin receiving apertures, a pivot pin disposed through a socket of said socketed arm, and an aperture of the other arm, said pivot pin pivotally interconnecting said arms, a rotatable key for rotating the pivot pin, said key having a deformed surface area facing inwardly toward said sockets, the distance between said area and said pivot pin corresponding to the distance between a pair of said sockets and means diverging the handle ends of said clamping arms and converging the clamping jaws of said clamping arms, said means comprising a coil spring embracing said pin and having two extensions engaging said arms at their respective ends.

JOHN M. HARGRAVE.
DELBERT L. FARMER.

References Cited in the file of this patent
UNITED STATES PATENTS

| Number | Name | Date |
| --- | --- | --- |
| 1,122,165 | Schoening | Dec. 22, 1914 |
| 1,867,505 | Graner | July 12, 1932 |
| 2,238,386 | Frank | Apr. 15, 1941 |
| 2,519,652 | Hargrave | Aug. 22, 1950 |